US009859956B2

United States Patent
Kissin et al.

(10) Patent No.: US 9,859,956 B2
(45) Date of Patent: Jan. 2, 2018

(54) POWER SUPPLY CONTROL IN WIRELESS POWER TRANSFER SYSTEMS

(71) Applicant: QUALCOMM Incorporated, San Diego, CA (US)

(72) Inventors: Michael Kissin, Auckland (NZ); Nicholas A Keeling, Auckland (NZ); Jonathan Beaver, Auckland (NZ); Edward Van Boheemen, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 889 days.

(21) Appl. No.: 13/828,831

(22) Filed: Mar. 14, 2013

(65) Prior Publication Data

US 2014/0054971 A1 Feb. 27, 2014

Related U.S. Application Data

(60) Provisional application No. 61/692,897, filed on Aug. 24, 2012.

(51) Int. Cl.
*H01F 27/42* (2006.01)
*H01F 38/42* (2006.01)
(Continued)

(52) U.S. Cl.
CPC ............ *H04B 5/0037* (2013.01); *H02J 5/005* (2013.01); *H02J 7/025* (2013.01); *H04B 5/0075* (2013.01);
(Continued)

(58) Field of Classification Search
CPC ...... H04B 5/0037; H04B 5/0031; H04B 5/00; H04B 5/0087; B60L 11/182; B60L 11/18;
(Continued)

(56) References Cited

U.S. PATENT DOCUMENTS 6,456,508 B1 * 9/2002 Namai ............... H02J 9/062
318/116
7,889,520 B2 * 2/2011 Moiseev ............... H01F 3/14
336/178
(Continued)

FOREIGN PATENT DOCUMENTS

CN 101073193 A 11/2007
CN 101939905 A 1/2011
(Continued)

OTHER PUBLICATIONS

International Search Report and Written Opinion—PCT/US2013/056022—ISAEPO—Mar. 24, 2014.
(Continued)

*Primary Examiner* — Jared Fureman
*Assistant Examiner* — Esayas Yeshaw
(74) *Attorney, Agent, or Firm* — Knobbe, Martens, Olson & Bear, LLP

(57) ABSTRACT

This disclosure provides systems, methods and apparatus for wireless power transfer and particularly wireless power transfer to remote system such as electric vehicles. In one aspect an apparatus for use with a wireless power transfer transmitter device comprising a first inductive element for generating a magnetic field, is provided. The apparatus comprises a direct current (DC) power source having an adjustable output voltage. The apparatus also comprises an inverter configured to convert the adjustable output voltage of the DC power source to alternating current. The apparatus also comprises at least one controller configured to receive an indication of current in the first inductive element and control the output voltage of the DC power source in response to the indication of current in the first inductive element. The apparatus reduces distortion signals in the
(Continued)

alternating current output of the inverter while maintaining current in the inductive element substantially constant.

36 Claims, 9 Drawing Sheets

(51) Int. Cl.
H04B 5/00 (2006.01)
H02J 5/00 (2016.01)
H02J 7/02 (2016.01)
H02M 7/48 (2007.01)

(52) U.S. Cl.
CPC ....... *B60L 2210/30* (2013.01); *B60L 2210/40* (2013.01); *H02M 2007/4818* (2013.01); *Y02B 70/1441* (2013.01); *Y02T 10/7241* (2013.01)

(58) Field of Classification Search
CPC .............. B60L 11/1824; B60L 11/1861; B60L 11/1811; B60L 11/1829; B60L 11/1833; B60L 11/1838; B60L 11/1842; B60L 11/1844
USPC ........................................................ 307/104
See application file for complete search history.

(56) References Cited

U.S. PATENT DOCUMENTS

| 8,587,153 B2* | 11/2013 | Schatz ................. B60L 3/0069 307/104 |
| 8,674,551 B2* | 3/2014 | Low ....................... H02J 5/005 307/104 |
| 8,855,554 B2 | 10/2014 | Cook et al. |
| 2002/0089305 A1 | 7/2002 | Park et al. |
| 2004/0130916 A1* | 7/2004 | Baarman ................. A61L 2/10 363/21.02 |
| 2005/0225275 A1* | 10/2005 | Eskritt .................. B62D 5/065 318/437 |
| 2009/0121675 A1 | 5/2009 | Ho et al. |
| 2009/0224609 A1 | 9/2009 | Cook et al. |
| 2010/0109604 A1 | 5/2010 | Boys et al. |
| 2010/0151808 A1* | 6/2010 | Toncich ................. H02J 7/025 455/226.3 |
| 2010/0302144 A1* | 12/2010 | Burtner ................. G06F 3/0416 345/157 |
| 2011/0037423 A1* | 2/2011 | Koda ..................... H02P 6/182 318/400.37 |
| 2011/0127951 A1* | 6/2011 | Walley .................... H02J 7/025 320/108 |
| 2012/0086284 A1 | 4/2012 | Capanella et al. |
| 2012/0112553 A1 | 5/2012 | Stoner, Jr. et al. |
| 2012/0139356 A1 | 6/2012 | Jung et al. |
| 2012/0319479 A1* | 12/2012 | Covic .................... H02J 5/005 307/31 |
| 2013/0207482 A1* | 8/2013 | Madawala ........ H02M 3/33561 307/104 |

FOREIGN PATENT DOCUMENTS

| CN | 101951036 A | 1/2011 |
| CN | 101971458 A | 2/2011 |
| JP | 2002272127 A | 9/2002 |
| JP | 2010148221 A | 7/2010 |
| WO | WO-2008145982 A2 | 12/2008 |
| WO | WO-2009111597 A2 | 9/2009 |
| WO | WO-2011031169 A1 | 3/2011 |
| WO | WO-2011036545 A1 | 3/2011 |

OTHER PUBLICATIONS

Irwanto M., et al., "Optimum maximum voltage angle and current total harmonic distortion of uninterruptible power supply on three level single phase photovoltaic—Wind power hybrid inverter", Power Engineering and Optimization Conference (PEOCO), 2012 IEEE International, IEEE, Jun. 6, 2012 (Jun. 6, 2012), pp. 225-229, XP032453191, DOI: 10.1109/PEOCO.2012.6230865, ISBN: 978-1-4673-0660-7.

* cited by examiner

POWER SUPPLY CONTROL IN WIRELESS POWER TRANSFER SYSTEMS

CROSS REFERENCE TO RELATED APPLICATIONS

This application claims priority to U.S. Provisional Patent Application No. 61/692,897 entitled "POWER SUPPLY CONTROL IN WIRELESS POWER TRANSFER SYSTEMS" filed on Aug. 24, 2012, which is hereby incorporated by reference in its entirety.

FIELD

The present invention relates generally to wireless power transfer, and more specifically to devices, systems, and methods related to wireless power transfer to remote systems such as vehicles including batteries. More particularly, the present invention relates to controlling the output voltage of a DC power source in wireless power transfer transmitter devices used in wireless power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure is an apparatus for wireless power transfer. The apparatus includes a direct current (DC) power source having an adjustable output voltage. The apparatus further includes an inverter configured to convert the adjustable output voltage to an alternating current. The apparatus further includes a first inductive element configured to receive the alternating current from the inverter and generate a magnetic field. The apparatus further includes at least one controller configured to reduce at least one distortion signal in the alternating current while maintaining the alternating current in the first inductive element substantially constant.

Another aspect of the disclosure is a method of controlling wireless power transfer. The method includes providing to an inverter a direct current having an adjustable output voltage. The method further includes converting the adjustable output voltage to an alternating current. The method further includes supplying the alternating current to a first inductive element. The method further includes controlling the adjustable output voltage of the direct current to reduce the at least one distortion signal in the alternating current while maintaining the alternating current substantially constant in the first inductive element. The method further includes generating a magnetic field for transferring wireless power to an inductive element.

Another aspect of the disclosure is an apparatus for wireless power transfer, the apparatus comprising means for providing a direct current having an adjustable output voltage. The apparatus further includes means for converting the adjustable output voltage to alternating current. The apparatus further includes means for receiving the alternating current. The apparatus further includes means for generating a magnetic field. The apparatus further includes means for reducing the at least one distortion signal in the alternating current while maintaining the alternating current substantially constant. The apparatus further includes means for generating a magnetic field for transferring wireless power to an inductive element.

Figure 1:
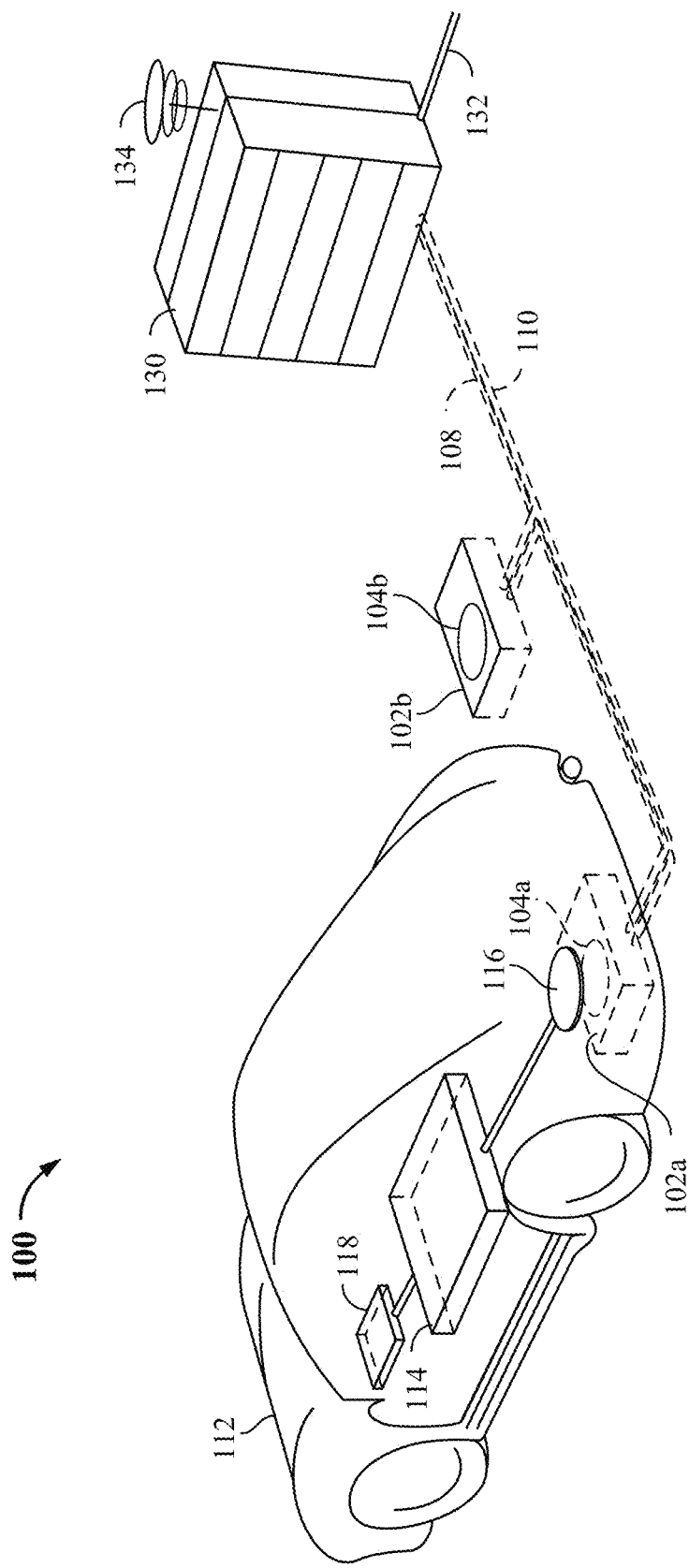
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device.

Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Inductive power transfer (IPT) systems are one means for the wireless transfer of energy. In IPT, a primary (or "base") power device transmits power to a secondary (or "pick-up") power receiver device. Each of the transmitter and receiver power devices includes inductive elements—typically coils or windings of electric current conveying media. An alternating current in the primary inductive coil produces a varying electromagnetic field. When the inductive coil of the pick-up is within the fluctuating electromagnetic field, an electromotive force (EMF) is induced, thereby transferring power to the pick-up.

Some IPT systems use resonant inductive coupling, in which power is transmitted between inductive coils that are tuned to resonate at a certain frequency. Resonant coupling may be achieved by adding inductive and/or capacitive elements in series or parallel with the induction coils, or a combination thereof.

In a resonant IPT system, the amount of power transferred to the pick-up is dependent on the degree of coupling between the primary and secondary inductive coils. The greater the coupling, the more power is transferred to the secondary inductive coil. The coupling coefficient is defined as the fraction of flux of the primary inductor coil that cuts the secondary inductor and is a function of the geometry of the system. The coupling coefficient is therefore dependent on the distance between the primary and secondary inductors, and their alignment.

In wireless power transfer systems for charging electric vehicles using IPT there can be large variations in the level of coupling each time a vehicle is charged. The distance and alignment between the primary and secondary coils may vary based on the location of the coils and the positioning of the vehicle, on which the pick-up is mounted, with respect to the base. This variation in coupling can create difficulties when it comes to configuring the system to deliver optimal power to an electric vehicle battery.

In some existing IPT systems for charging electric vehicles, switching is performed in the power supply in the base to compensate for variation in coupling—varying the current in the primary coil in order to achieve a constant output current for a given voltage. In a poorly coupled system, the current in the primary inductive coil may be substantially higher than the current in the primary inductive coil in a closely coupled system to achieve the same current output from the secondary inductive coil. Such variation in the current in the primary coil places significant stress on the power electronic components in the system, resulting in the need for more expensive componentry, reducing reliability and limiting operating range.

One of the limitations on the ability to adjust the primary inductive coil current is the duty cycle of the inverter converting a direct current into an alternating current for the primary coil. To reduce the primary current the duty cycle may also be decreased. This has the undesirable effect of increasing both conduction and switching losses within the semi-conductor switches and the antiparallel diodes when such components are used in the inverter.

More particularly, in common systems where there may be no control variables on the vehicle side of the system, the conduction angle of the inverter bridge may change as either the coupling between the base and vehicle pads changes, or as the current demand on the vehicle controller changes, in order to meet these demands. In some situations, this can cause the conduction angle of the bridge to become very small, even when delivering significant power. This means that the time over which power is conducted is reduced, resulting in high peak currents being borne by the components. Further, the harmonics or other undesirable frequencies generated at such angles are more prominent, with the associated distortion signals generally being undesirable.

Distortion signals generally refer to undesired signal components that alter the desired signal characteristics, including shape, magnitude, and frequency content. Active system components such as transistors or operational amplifiers typically have non-linear transfer functions, which result in non-linear distortion.

Distortion from multiple system components may be characterized as harmonic distortion, amplitude distortion, phase distortion, or other types of distortion. Harmonic distortion signals are undesired signals that are generally integer multiples of the desired signal frequency. Harmonic distortion may be characterized in terms of the individual strength of individual harmonics (i.e., the third harmonic), or in aggregate (i.e., Total Harmonic Distortion).

FIG. 1 is a diagram of an exemplary wireless power transfer system 100 for charging an electric vehicle 112, in accordance with an exemplary embodiment of the invention.

The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zigzag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
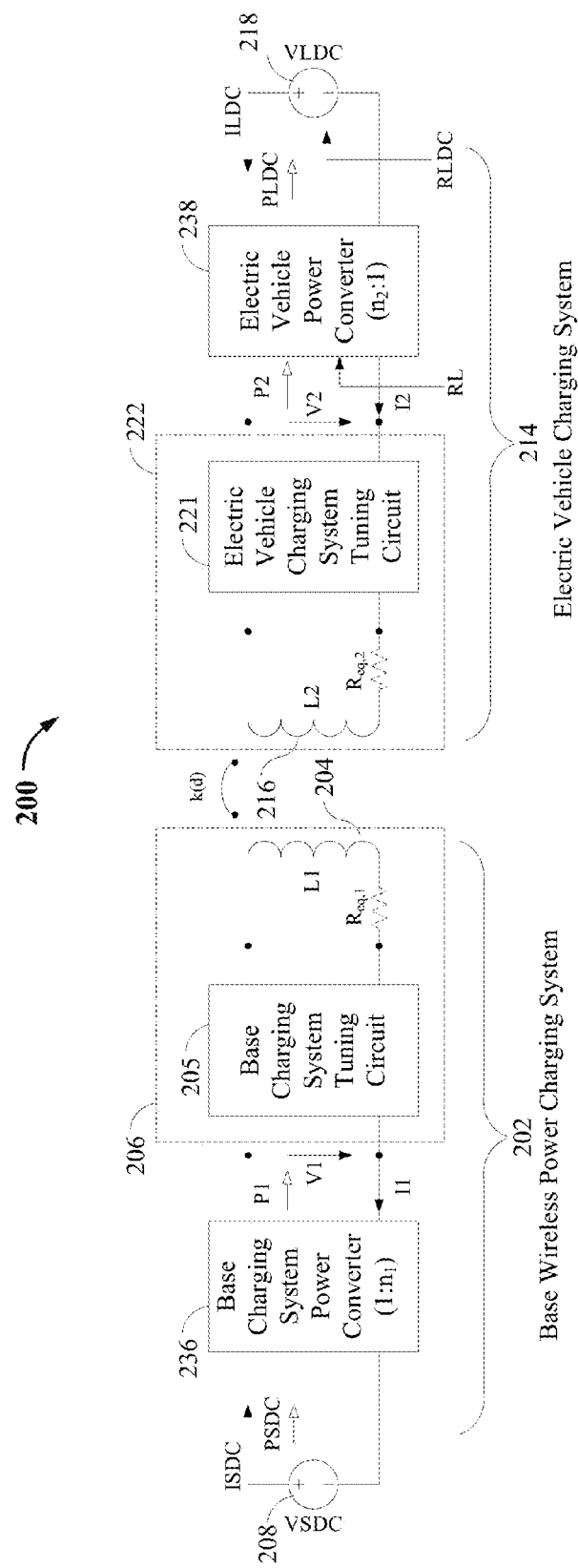
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including an electric vehicle charging system tuning circuit 221 and electric vehicle induction coil 116. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 316 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy for coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
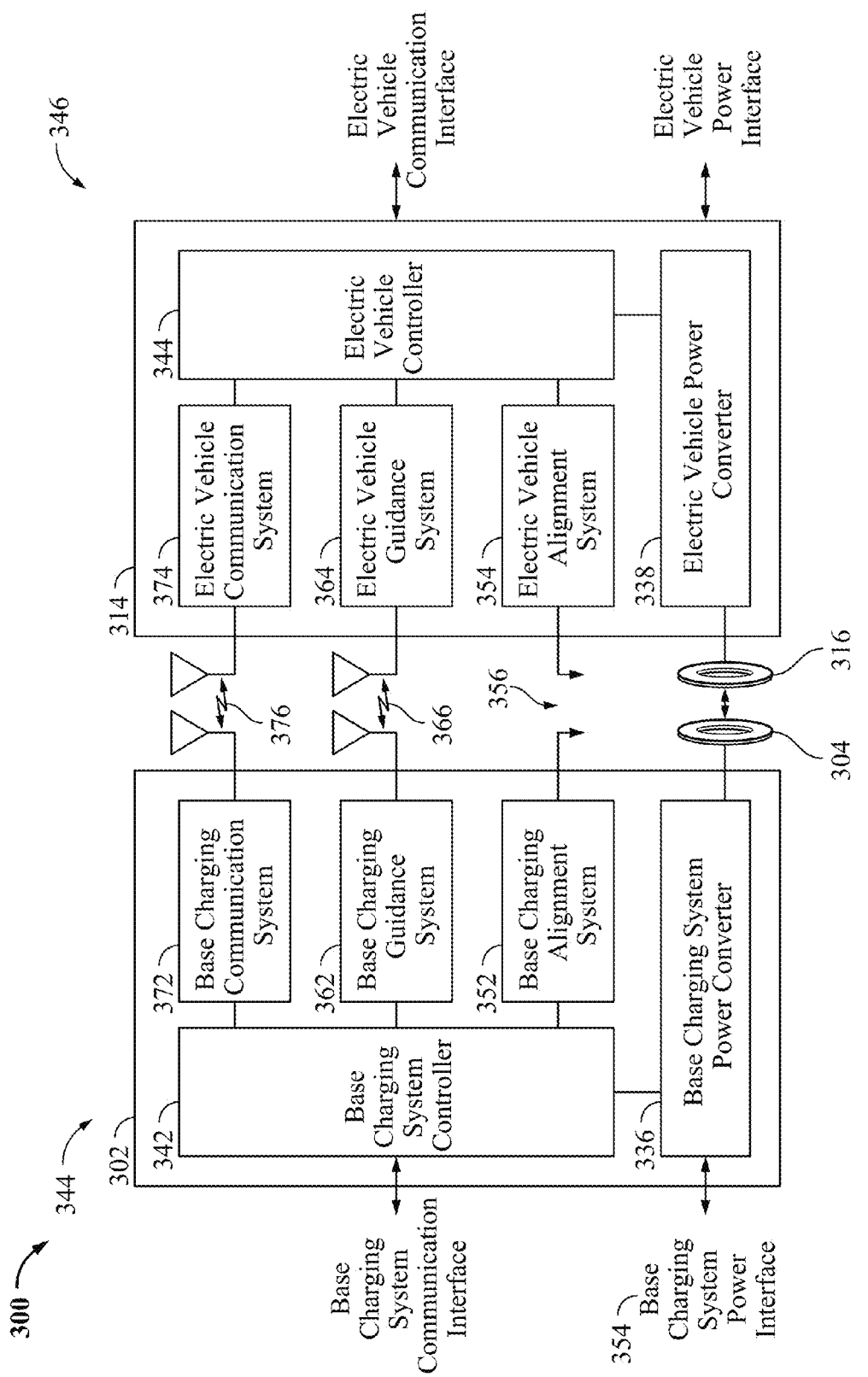
FIG. 3 is a functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
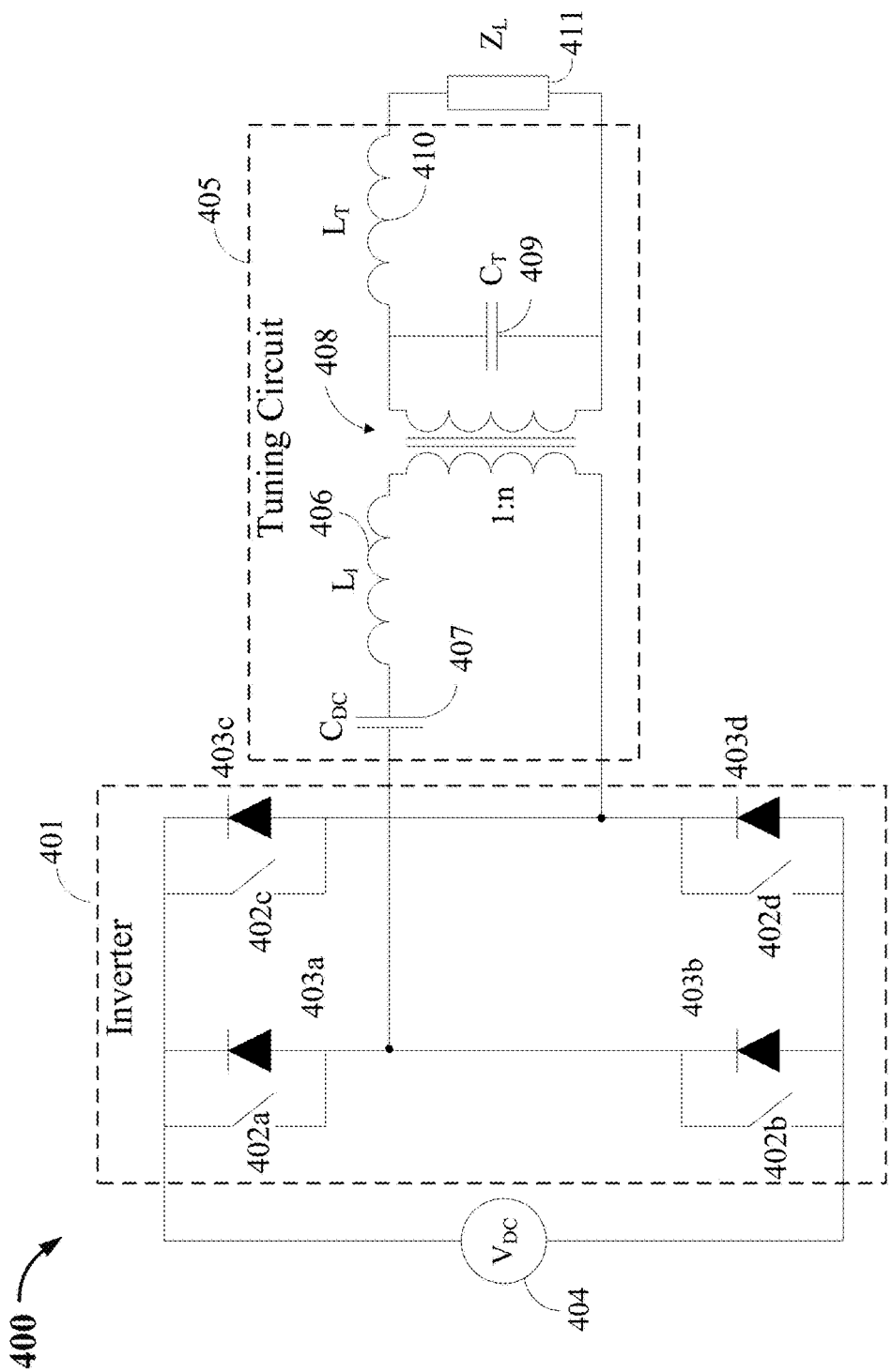
FIG. 4 is a schematic diagram of exemplary components of part of a wireless power transfer system according to an exemplary embodiment of the invention.

FIG. 4 is a schematic diagram of exemplary components of part of the wireless power transfer system, for example that shown in FIG. 2, according to an exemplary embodiment of the invention. A base system 400 comprises a power inverter 401 comprising four switching elements 402a, 402b, 402c and 402d and four associated diodes 403a, 403b, 403c, and 403d. The switching elements are connected across the diodes such that each diode can be short circuited if the respective switching element is closed. Direct current is provided to the inverter 401 by a DC power source 404. The output of the inverter 401 may herein be referred to as the bridge current.

A tuning circuit 405, including a first inductor 406, DC blocking capacitor 407, transformer 408, tuning capacitor 409, and primary inductive element 410, functions as described with reference to the base charging tuning circuit 205 and base system induction coil 204 of FIG. 2. In use, the base or primary inductive element 410 emits an electromagnetic field, which induces a voltage in the vehicle or secondary inductive element of an electric vehicle receive circuit which may function as described with reference to the electric vehicle receive circuit 222 of FIG. 2. Element 411 represents the load impedance $Z_L$ presented by the electric vehicle receive circuit to the base 400.

The current in the primary inductive element 410 may herein be referred to as the primary inductive element current ($I_T$). Assuming a tuned LCL network, the primary inductive element current is dependent on two variables: the inverter 401 output voltage ($V_i$) and the reactance of the first inductive element ($X_L$) according to the following equation:

$$I_T = \frac{V_i}{X_L} \tag{1}$$

It should be appreciated that while this embodiment is described with particular reference to an LCL network, the broader principles may be similarly implemented in a system using an LC tuning network. The output voltage of the inverter 401 is dependent on the DC power source 404 adjustable output voltage (e.g., DC voltage $V_{DC}$) and the conduction angle ($\theta$, which may take any value from 0° to 180°) of the inverter bridge according to the following equation:

$$V_i = \frac{4 \, V_{DC}}{\pi} \sin\left(\frac{\theta}{2}\right) \tag{2}$$

The conduction angle $\theta$ generally corresponds to a duty cycle. Higher conduction angles correspond to more time that power is being delivered. A lower conduction angle translates to lower voltage and higher current for the same power. Lower conduction angles require higher currents. In some implementations, inverter 401 operates at conduction angles over 90°. Avoiding lower conduction angles and their associated higher currents increases component life.

Total harmonic distortion (THD) is a measure that characterizes harmonic distortion signals. The THD is calculated using the formula:

$$THD = \frac{\sqrt{\sum_{n=2}^{\infty} V_n^2}}{V_i} \tag{6}$$

Figure 7:
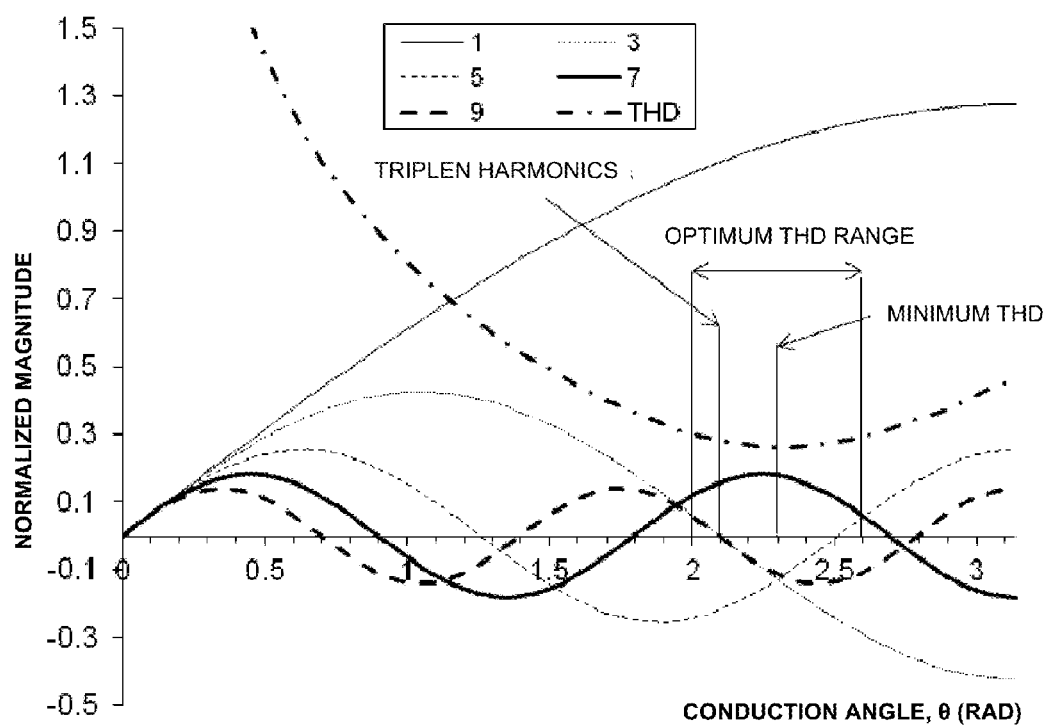
FIG. 7 is a graph illustrating the magnitude of harmonics against conduction angle in an inverter according to an exemplary embodiment of the invention.

As shown in FIG. 7, THD is at a minimum at approximately 130°. If the inverter 401 is run at substantially 130° then the total harmonic distortion (THD) of the output voltage may be reduced. As inverter 401 increases the conduction angle from 120° to approximately 130°, third order harmonics increase as fifth order harmonics decrease. THD doesn't vary much between 120° and 130°, and increases slowly as it approaches 140°. Some implementations operate in the range of 120° to 140°.

It is envisioned that by controlling the inverter 401 to maintain a conduction angle within a range of substantially 120° to substantially 140°, the THD may be reduced while still providing a control variable for optimization of variation in inverter current. It should be appreciated that this is not intended to be limiting, and that other conduction angles outside the 120° to 140° range may be used.

According to this equation, the inverter 401 output voltage (at the fundamental frequency) may be varied from 0 to 1.273 times the DC power source 404 voltage. It is envisioned that the conduction angle may be between 120° ($1.1V_{DC}$) and 140° ($1.2V_{DC}$) so as to reduce the generation of harmonics (as discussed further below).

These equations can be combined as follows:

$$I_T = \frac{4\,V_{DC}}{\pi X_L} \sin\left(\frac{\theta}{2}\right) \qquad (3)$$

The load on the inverter may be determined by several physical attributes of the system: the LCL network design, the primary inductive element inductance delta (determined by the effect of the receive circuit on the primary inductive element), and the real load required by the receive circuit 411.

Assuming that the LCL network is tuned—i.e. there is no net reactive load on the inverter 401 at the fundamental frequency—the real load on the inverter 401 may be determined by the parasitic losses within the primary tuning circuit 405 and transformer 408, as well as the load required by the receive circuit 411.

As an example, assume this load is 3500 W. For a power load ($P_L$), the current draw or bridge current ($I_i$) from the inverter 401 may be given by the following equation:

$$I_i = \frac{P_L}{V_i} \qquad (4)$$

For a given power, the inverter current may increase as the inverter 401 voltage falls. From another perspective, as the primary inductive element current lowers, the inverter output current rises to sustain a given power transfer. The same logic may hold true for the reactive part of the power. Given that the reactive load on the inverter 401 may be determined by physical parameters, the inverter 401 may not influence the reactive power draw, and the reactive current that the inverter 401 sources may also increase with a falling inverter output voltage.

The high inverter currents may cause conduction and switching losses within the inverter 401 to increase, as well as conduction losses within the transformer 408, and DC blocking capacitor 407 of the tuning circuit 405.

There is a secondary effect of lower inverter conduction angles that should also be considered. As the conduction angle decreases, higher currents are borne by the antiparallel body diodes 403*a-d* in the inverter 401. These currents may also have high crest factors that place further stress on the diodes.

Figure 5:
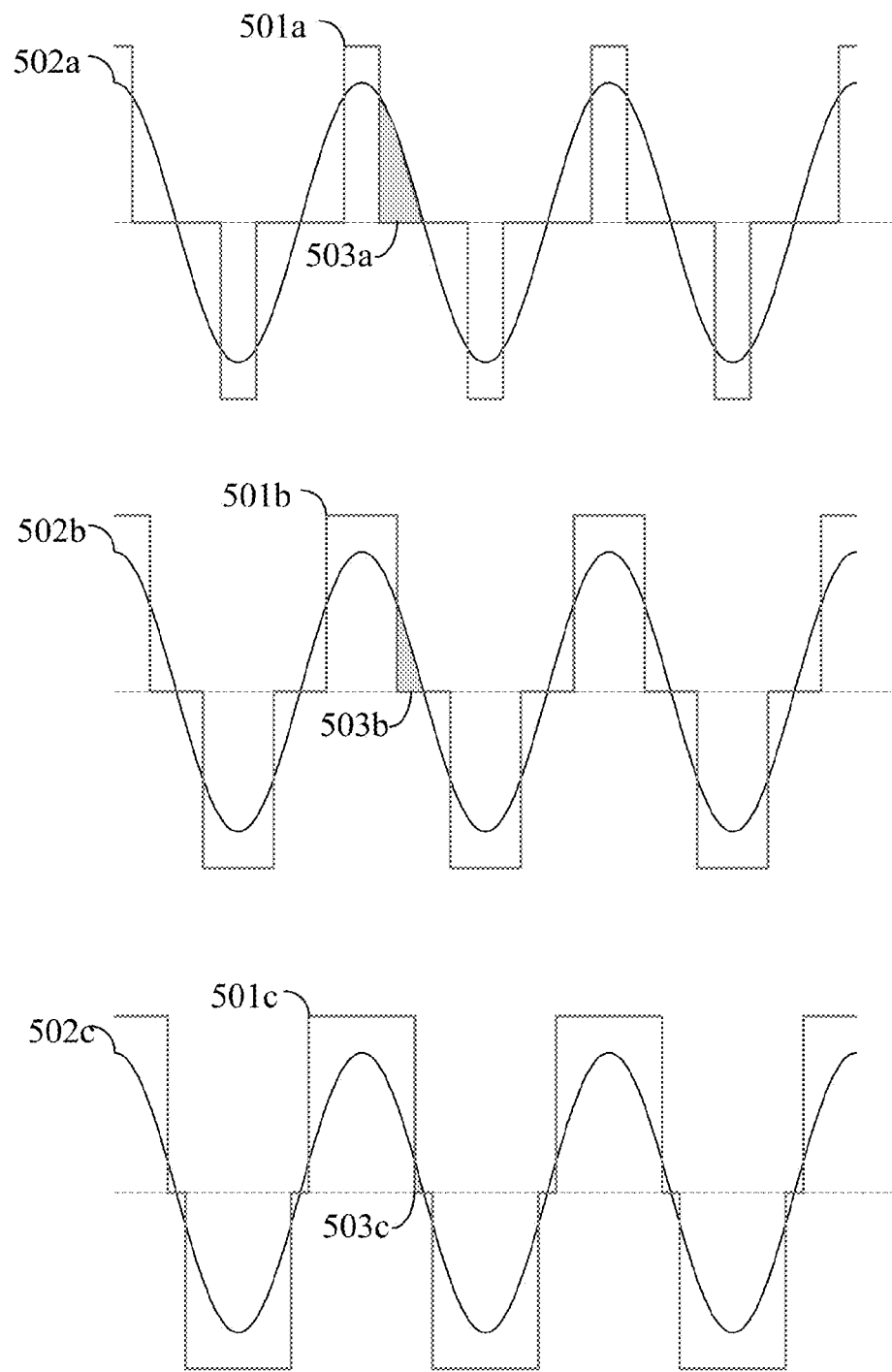
FIG. 5 is series of current/voltage graphs illustrating the effect of a change in load current demand in an inverter according to an exemplary embodiment of the invention.
Figure 6:
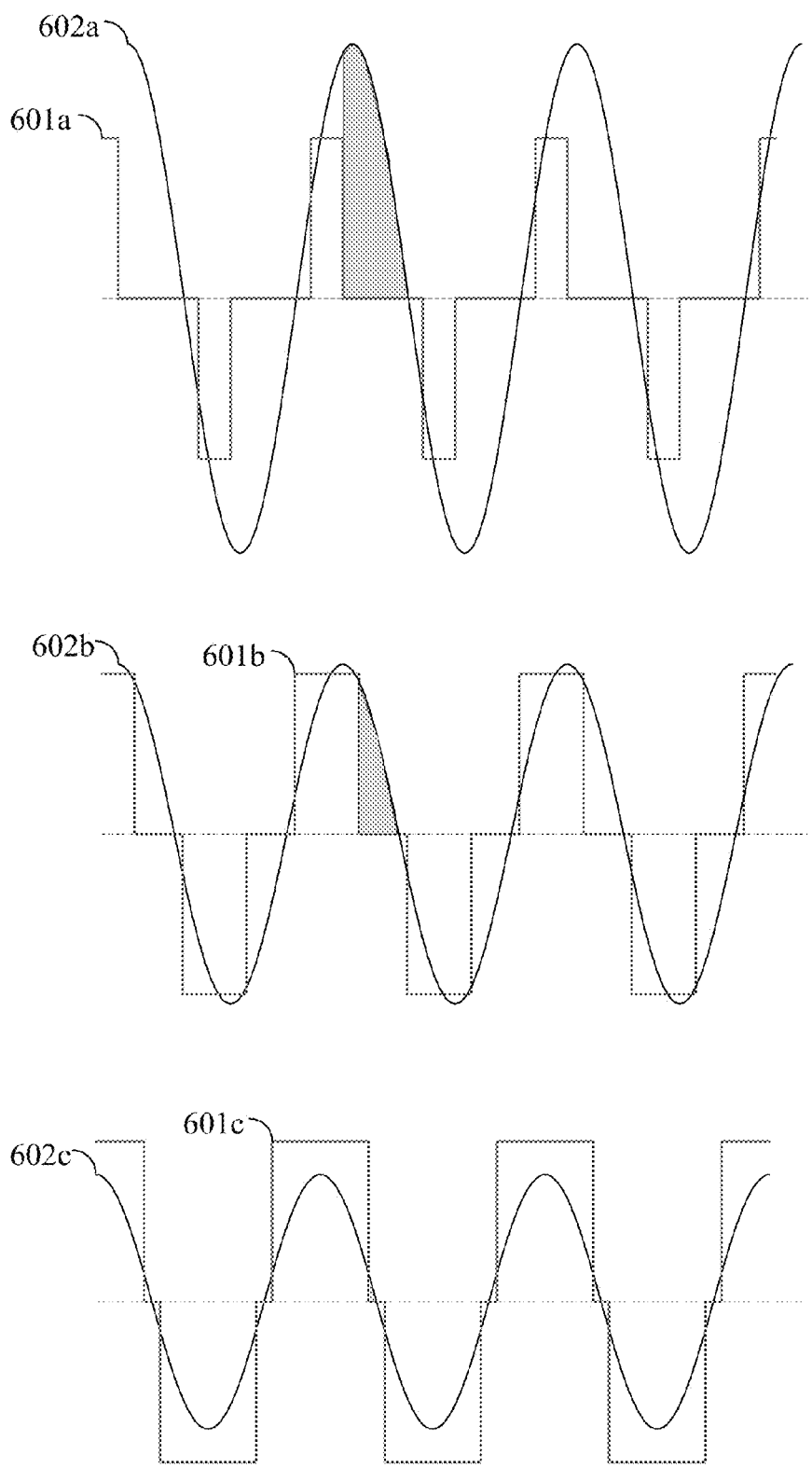
FIG. 6 is series of current/voltage graphs illustrating the effect of a change in coupling while load current demand remains constant in an inverter according to an exemplary embodiment of the invention.

This effect is illustrated in FIG. 5 and FIG. 6, where the inverter 401 output voltage is shown in traces 501*a*, 501*b*, and 501*c*, and 601*a*, 601*b*, and 601*c*, and the inverter 401 output current is shown in traces 502*a*, 502*b*, and 502*c*, and 602*a*, 602*b*, and 602*c*. Traces 501*a*, 502*a*, 601*a* and 602*a* show the scenario where conduction angle equals 50°, traces 501*b*, 502*b*, 601*b* and 602*b* show the scenarios where conduction angle equals 100°, and traces 501*c*, 502*c*, 601*c* and 602*c* show the scenarios where conduction angle equals 150°.

FIG. 5 illustrates the result of a change in the load current demand, while FIG. 6 illustrates the result of a change in coupling while load current demand remains constant.

The current that is conducted through the diodes 403*a-d* is the current that is being conducted while the output voltage is zero. An example of this is marked areas 503*a*, 503*b*, and 503*c* in each of the respective waveforms. It may be noted that a low conduction angle may result in a larger current being required to be conducted through the diodes.

In accordance with an embodiment, controlling the conduction angle may assist in reducing the effects of harmonics in the system. Only odd harmonics are present in the inverter output voltage (n=1, 3, 5, 7, 9 . . . ). The magnitude of the nth harmonic can be found using the formula:

$$V_n = \frac{4}{n\pi} \sin\left(\frac{n\theta}{2}\right) \qquad (5)$$

FIG. 7 illustrates the magnitude of harmonics against conduction angle. The vertical and horizontal axes of FIG. 7 depict normalized magnitude and conduction angle in radians, respectively. FIG. 7 shows six different curves. The first curve is the desired first harmonic corresponding to n=1 and labeled 1 in the FIG. 7 legend, which increases monotonically and largely linearly from 0 to π radians. The second, third, fourth, and fifth curves of FIG. 7 depict the third, fifth, seventh, and ninth harmonics corresponding to n=3, 5, 7, and 9, respectively. These harmonics are labeled 3, 5, 7, and 9 in the FIG. 7 legend. Harmonics 3 and 9 cross the horizontal axis at 120°. The sixth curve on FIG. 7, labeled THD, graphs total harmonic distortion. THD reaches a minimum at approximately 130°. The optimum THD range, where THD is minimized is between 120° and 140°.

As shown in FIG. 7 for the curve where n=1 (the desired signal), the relationship between conduction angle and voltage is linear over most of the conduction angle scale. A 10% increase in conduction angle at 120° results in an approximately 10% increase in voltage. At higher conduction angle the relationship between conduction angle and voltage levels off. This plateau effect is first apparent at 140°, and is more pronounces over 160°. A 10% increase in conduction angle at 160° only yields a 2% increase in voltage. Conduction angles above 160° result in increased harmonics (n=3, 5, 7, 9, 11, . . . ) with little gain in the magnitude of the desired signal.

FIG. 7 depicts harmonics 3, 5, 7, and 9. The power associated with harmonics decrease as n increases, so higher level harmonics are not shown. At certain conduction angles, harmonics may be eliminated. FIG. 7 shows that if the inverter 401 is run at substantially 120° then "triplen" (odd multiples of 3, i.e. 3, 9, 15, etc.) harmonics may be eliminated from the voltage and the first undesired harmonic present is therefore the fifth. FIG. 7 shows that different harmonics are eliminated at different conduction angles. Note the zero crossing for harmonic five at 144°.

Figure 8:
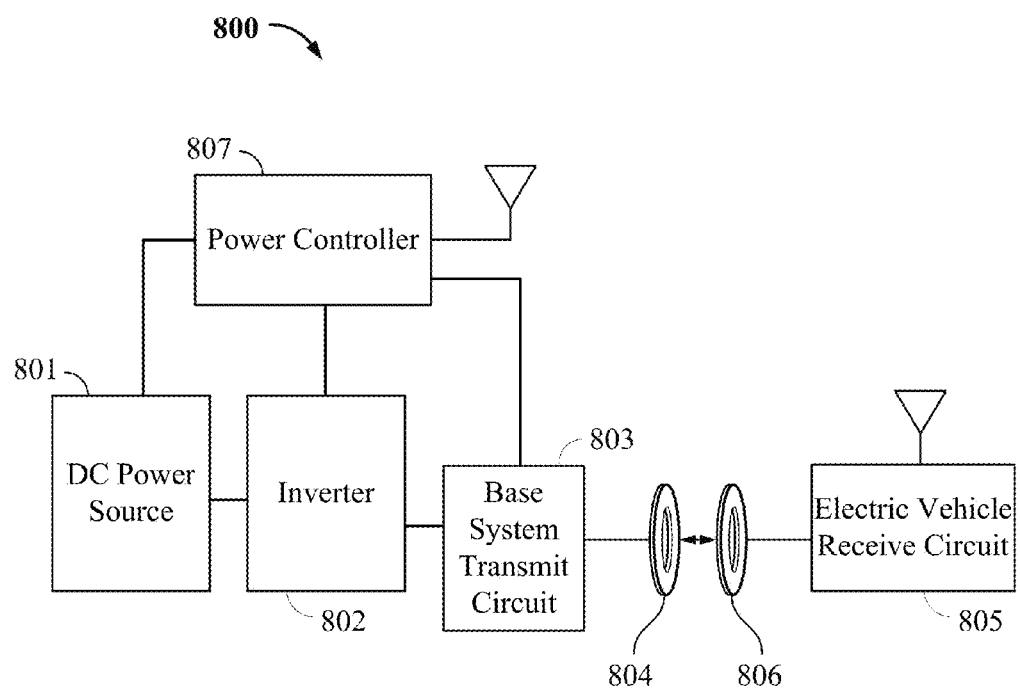
FIG. 8 is a functional block diagram of exemplary components of part of a wireless power transfer system according to a further exemplary embodiment of the invention.

FIG. 8 is a schematic diagram of exemplary components of part of a wireless power transfer system 800 in which the voltage of a DC power source 801 and the conduction angle of an inverter 802 may be controlled to achieve the effects substantially described above.

The system 800 includes a base system transmit circuit 803 including a base system induction coil 804. The system 800 further includes an electric vehicle receive circuit 805 including an electric vehicle induction coil 806. Power may be transferred from the base system transmit circuit 803 to the electric vehicle induction coil 806 in substantially the same manner as described with reference to FIG. 1, FIG. 2, and FIG. 3.

The system 800 may further include a power controller 807, configured to control both the voltage output from the DC power source 801 and the conduction angle of the inverter 802 based on the primary inductive element current in the base system induction coil 804.

Figure 9:
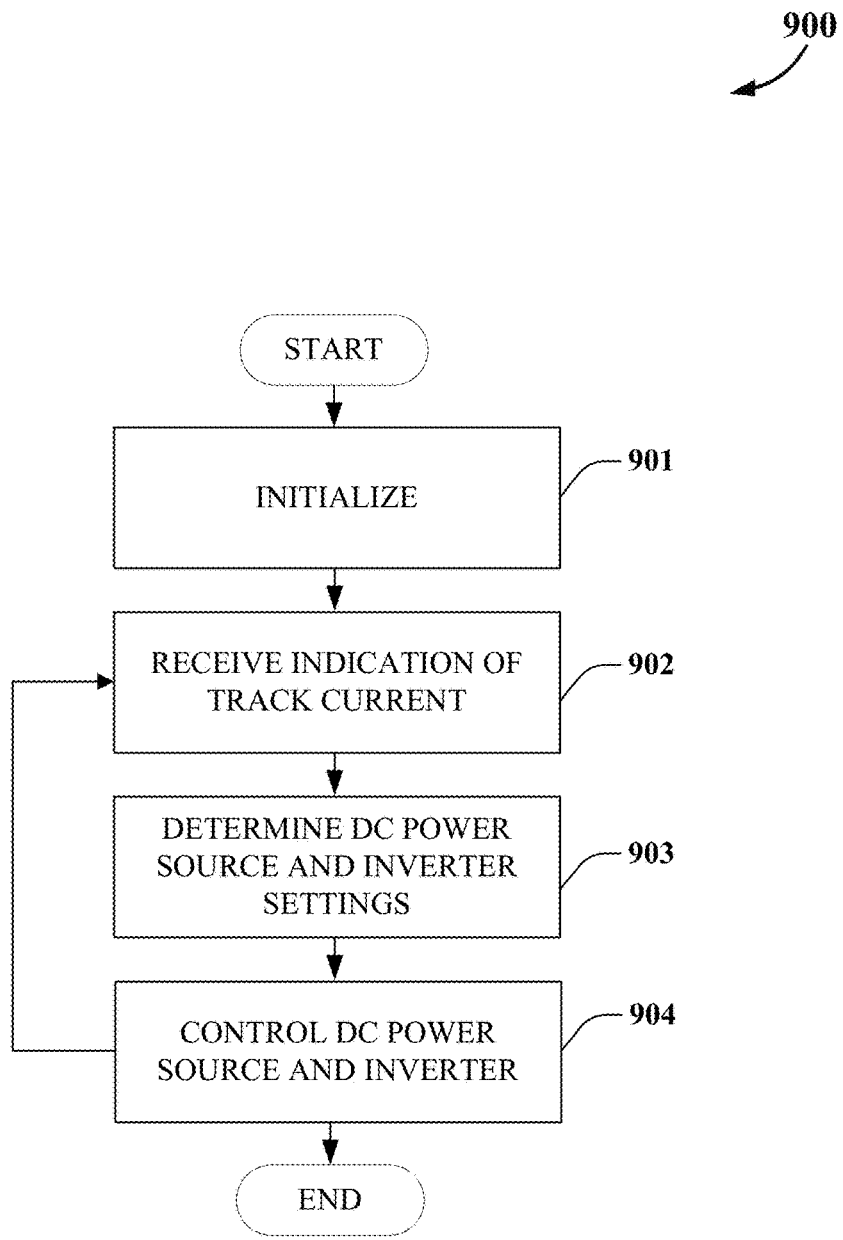
FIG. 9 is a flow chart illustrating a method of operating a wireless power transfer system according to an exemplary embodiment of the invention.

The power controller 807 may be in communication with the base system transmit circuit 803 and/or electric vehicle receive circuit 805 in order to obtain an indication of the primary inductive element current, as will be described further below with reference to FIG. 9.

Operation of the wireless power transfer system shown in FIG. 8 will now be described with reference to FIG. 9, which is a flow chart illustrating a method 900 of operating a wireless power transfer system according to an exemplary embodiment of the invention.

At block 901, the system 800 is initialized on determining that power is to be transferred from the base system transmit circuit 803 to the electric vehicle receive circuit 805. The power controller 807 may set the Power Correction Factor of the DC power source 801 such the output voltage is minimal, and the conduction angle of the switches of the inverter 802 to substantially 0°.

At block 902 the power controller 807 receives an indication of the current in the base system induction coil 804 ("primary inductive element current"). Reference to an indication of current in the base system induction coil 804 should be understood to mean any measurement whereby the current in the base system induction coil 804 may be determined. For example, the indication of current may be a measurement of current taken directly from the base system induction coil 804. However, in an alternative embodiment the indication of current may be a measurement of current in the electric vehicle induction coil 806, which in an LCL tuned system such as that illustrated by FIG. 4 is proportional to the current in the base system induction coil 804.

At block 903 the power controller 807 determines control settings for the DC power source 801 and inverter 802 to achieve the required primary inductive element current.

At block 904 the power controller 807 transmits the control settings to the DC power source 801 and inverter 802, and loops back to block 902.

It is envisioned that control may be initially achieved by ramping the conduction angle of the switches of the inverter 802 to substantially 130°. If the power demands require a greater primary inductive element current the output voltage of the DC power source 801 may be increased to an upper voltage threshold. Further power requirements may be achieved by adjustment of the conduction angle of the inverter 802 outside of the range of substantially 120° to 140°.

If power demands reduce, adjustment of the conduction angle to substantially 120° to 140° may be prioritized before adjustment of the output voltage of the DC power source 801. If the DC power source 801 voltage is at a minimum, then the conduction angle may be reduced towards 0°.

In one embodiment, the desired settings for a particular primary inductive element current may be stored in a look-up table.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wireless power transfer, the apparatus comprising
    a direct current (DC) power source having an adjustable output voltage;
    an inverter configured to convert the direct current to an alternating current;
    an LCL network having a first inductive element configured to receive the alternating current from the inverter and generate a magnetic field; and
    at least one controller configured to reduce at least one distortion signal in the alternating current while maintaining the alternating current in the first inductive element substantially constant by directly controlling at least the inverter.

2. The apparatus of claim 1, wherein the at least one distortion signal comprises at least one odd harmonic component of the alternating current.

3. The apparatus of claim 1, wherein the inverter comprises at least one switching element.

4. The apparatus of claim 3, wherein the at least one controller is configured to receive an indication of a level of the alternating current in the first inductive element.

5. The apparatus of claim 4, wherein the level of the alternating current is based on a direct measurement of current in the first inductive element.

6. The apparatus of claim 4, wherein the indication of the level of the alternating current is based on a direct measurement of current induced in a second inductive element by the magnetic field generated by the first inductive element.

7. The apparatus of claim 4, wherein the at least one controller is configured to control at least one of the adjustable output voltage of the DC power source and a conduction angle of the at least one switching element to reduce the at least one distortion signal in the alternating current based on the indication of the current level in the first inductive element.

8. The apparatus of claim 3, wherein the at least one controller controls the conduction angle of the at least one switching element to reduce the total harmonic distortion of the alternating current.

9. The apparatus of claim 7, wherein the at least one controller is configured to control the conduction angle of the at least one switching element within a range of substantially 120 degrees to 140 degrees.

10. The apparatus of claim 7, wherein the at least one controller is configured to control the adjustable output voltage of the DC power source and control the conduction angle of the at least one switching element based on power demand.

11. The apparatus of claim 7, wherein the controller is configured to increase the output voltage of the DC power source and adjust the conduction angle within the range of substantially 90 degrees to 160 degrees.

12. The apparatus of claim 7, wherein the controller is configured to control the conduction angle of the at least one switching element before controlling the output voltage of the DC power source.

13. The apparatus of claim 7, wherein the controller is configured to determine control settings for the adjustable output voltage of the DC power source and the conduction angle of at least one switching element.

14. The apparatus of claim 13, wherein the controller is configured to modify control settings based on power demand variations.

15. A method of controlling wireless power transfer, the method comprising:
    providing to an inverter a direct current having an adjustable output voltage;
    converting the direct current to an alternating current;
    supplying the alternating current to a first inductive element of an LCL network;
    controlling the adjustable output voltage of the direct current to reduce at least one distortion signal in the alternating current while maintaining the alternating current substantially constant in the first inductive element by directly controlling at least the inverter; and
    generating a magnetic field for transferring wireless power to an inductive element.

16. The method of claim 15, wherein the at least one distortion signal comprises at least one odd harmonic component of the alternating current.

17. The method of claim 16, the method further comprising:
    receiving an indication of the level of the alternating current in the first inductive element; and
    controlling the adjustable output voltage of the DC power source based on the level of the alternating current in the first inductive element.

18. The method of claim 17, wherein the indication of a current level is a direct measurement of alternating current in the first inductive element.

19. The method of claim 17, wherein the indication of a current level is a measurement of current induced in a second inductive element by the magnetic field generated by the first inductive element.

20. The method of claim 17, the method further comprising controlling the conduction angle of at least one switching element in response to the current level in the first inductive element.

21. The method of claim 20, wherein controlling the conduction angle of the at least one switching element reduces the at least one distortion signal of the alternating current.

22. The method of claim 21, wherein the conduction angle of the switching elements is controlled within a range of substantially 120 degrees to 140 degrees.

23. The method of claim 21, the method further comprising determining control settings for adjustable output voltage of the DC power source and the conduction angle of at least one switching element based on power demand.

24. The method of claim 23, further comprising modifying control settings for adjustable output voltage of the DC power source and the conduction angle of at least one switching element are settings based on power demand variations.

25. An apparatus for wireless power transfer, the apparatus comprising
    means for providing a direct current having an adjustable output voltage;

means for converting the direct current to an alternating current;

means for receiving the alternating current from the means for converting;

means for generating a magnetic field in an LCL network; and means for reducing at least one distortion signal in the alternating current while maintaining the alternating current substantially constant, in the means for receiving the alternating current by directly controlling at least the means for converting.

26. The apparatus of claim 25, wherein the means for reducing the at least one distortion signal comprises controlling the adjustable output voltage of the direct current.

27. The apparatus of claim 25, wherein the at least one distortion signal comprises at least one odd harmonic component of the alternating current.

28. The apparatus of claim 27, the apparatus further comprising:

means for receiving an indication of the level of the alternating current in the inductive element; and means for controlling the adjustable output voltage of the DC power source based on the level of the alternating current in the first inductive element.

29. The apparatus of claim 28, wherein the indication of a current level is a direct measurement of alternating current in the first inductive element.

30. The apparatus of claim 28, wherein the indication of a current level is a measurement of current induced in a second inductive element by the magnetic field generated by the first inductive element.

31. The apparatus of claim 28, further comprising means for controlling the conduction angle of at least one switching element in response to the current level in the first inductive element.

32. The apparatus of claim 31, wherein controlling the conduction angle of the at least one switching element reduces the at least one distortion signal of the alternating current.

33. The apparatus of claim 31, wherein the conduction angle of the at least one switching element is controlled within a range of substantially 120 degrees to 140 degrees.

34. The apparatus of claim 31, wherein the means for controlling the adjustable output voltage of the DC power source and controlling the conduction angle of the at least one switching element are based on power demand.

35. The apparatus of claim 31, further comprising means for determining control settings for the adjustable output voltage of the DC power source and the conduction angle of the at least one switching element.

36. The apparatus of claim 35, further comprising modifying control settings for the adjustable output voltage of the DC power source and the conduction angle of the at least one switching element are settings based on power demand variations.

* * * * *